United States Patent Office 3,503,037
Patented Mar. 24, 1970

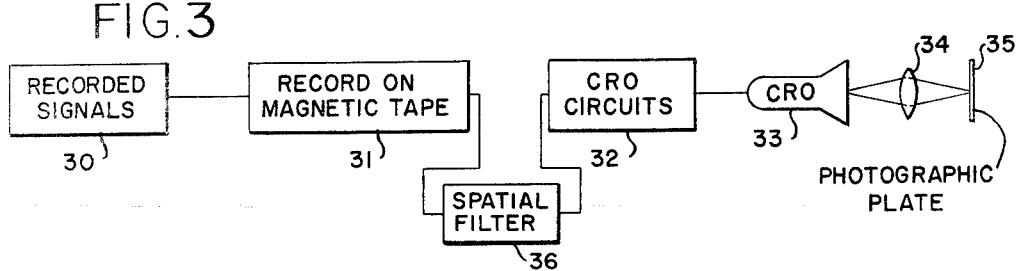
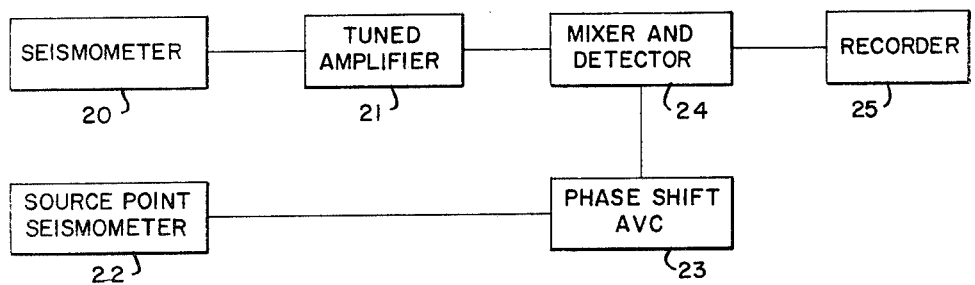
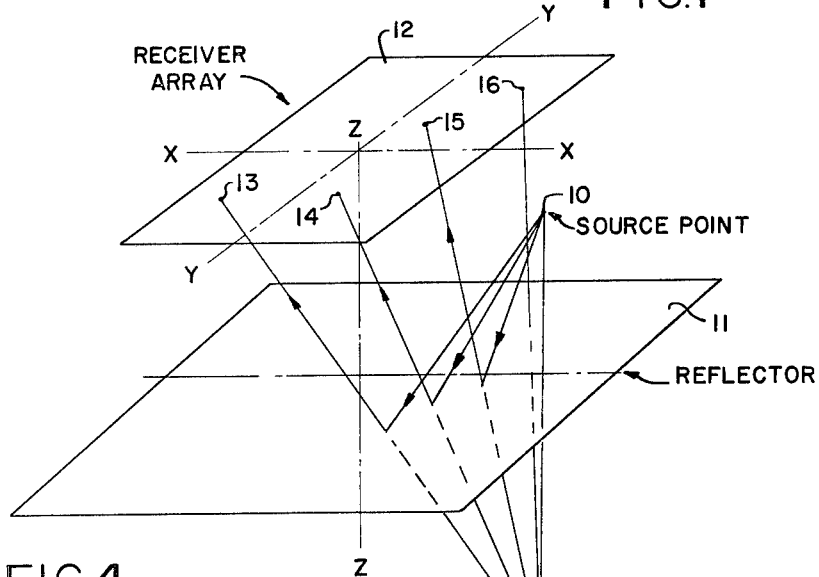
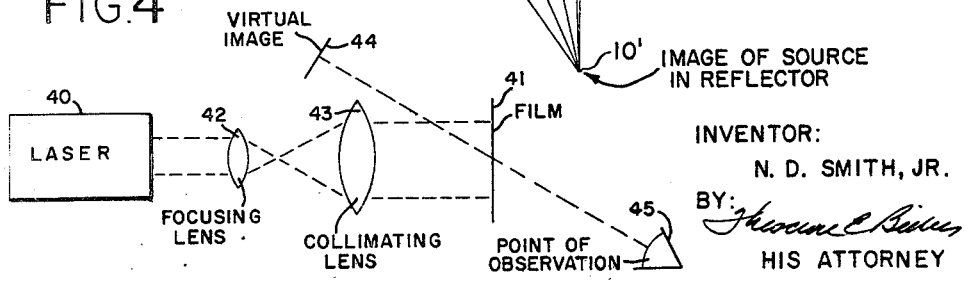

3,503,037
HOLOGRAPHIC SEISMIC EXPLORATION
Noyes D. Smith, Jr., Bellaire, Tex., assignor to Shell Oil
Company, New York, N.Y., a corporation of Delaware
Filed Aug. 8, 1967, Ser. No. 659,084
Int. Cl. G01v 1/34
U.S. Cl. 340—15.5                                    1 Claim

ABSTRACT OF THE DISCLOSURE

A three-dimensional image of a subterranean acoustically reflective and diffractive structure is produced by illuminating the structure with coherent acoustic waves and producing an optical hologram related to the acoustic image. Electrical signals related to the energy that is returned to areally dispersed locations are mixed with electrical signals related to the coherent acoustic waves. Corresponding portions of the intensity of the mixed signals are displayed in scaled locations to form an optical hologram from which the three-dimensional image is produced.

CROSS-REFERENCES TO RELATED APPLICATIONS

In a copending application by the same inventor entitled Method for Obtaining Acoustical Hologram of the Wall of a Tubular Member, Ser. No. 663,790, filed Aug. 28, 1967, there is shown a means for obtaining on optical 3-dimensional image from a hologram display as described hereinafter.

BACKGROUND OF INVENTION

Currently, seismic methods of exploration use an elastic disturbance or explosion that is initiated at a point or points near the surface of the earth and generates seismic waves that travel through the earth. The resulting reflected or diffracted seismic waves are recorded as a function of time at a number of points on the surface. The data is displayed as a time-distance plot in the form of variable-area, variable-density or single-line wiggle recording. The distribution of the elastic parameters in the earth is usually such that a number of coherent wave fronts can be observed in the recorded records. In the usual displays of the recorded signals, the intersection of the wave fronts with a surface line of observation points as a function of time is projected into a time-distance plane. Frequently it is possible to select wave fronts of suitable curvature to make an interpretive model of reflecting surfaces on the basis of geometrical optics of the once-reflected compressional waves.

A major problem of interpretation has been the selection of the meaningful wave fronts from the mass of data recorded. Frequency and space filtering have been developed to enhance the wave fronts of interest while minimizing the unwanted wave fronts and noise. Recently, major improvements in filtering have come from the digitizing of the recorded seismic data and digitally processing the data based on communication theory. While the digital processing of seismic data does improve the interpretation of the seismic data, it is still directed to the selection of wave fronts that can be used in the geometrical optical model in two dimensions. No satisfactory method of presenting seismic data in three dimensions has been developed and no method of using wave-optics is in use. Thus, the system still depends on the basic premise that the original elastic disturbance is only once reflected from a surface and that the geometrical optical model can be constructed by locating the resulting signal in the seismic data.

It has now become obvious that the once-reflected theory of seismic exploration is not entirely accurate. The elastic disturbance is not reflected as a single ray from a reflecting surface, but rather a multitude of rays having various phases. In view of the multiple waves reflected from a single reflecting surface, it is obvious that a seismic processing system based on a single ray reflection from a surface will have serious limitations. This problem is especially difficult in the case of deep reflecting surfaces that result in relatively weak seismic signals and thus seriously limit the information that can be obtained from the survey.

SUMMARY OF INVENTION

The present invention solves the above problems by generating an acoustic or seismic hologram of the reflecting surfaces. The seismic holograms are made into scaled optical holograms which, when viewed in coherent visible light, construct scaled optical images corresponding to the original acoustic image of any reflecting surfaces that are located within the acoustically sampled volume of the earth. Thus, a single-point reflector would appear as a bright point in the scaled optical image a scaled distance from the surface of the sampled volume. Similarly, if the sampled volume contained a single perfectly reflecting interface and there were no reflections from the surface of the earth, the reconstructed image space from the hologram would contain a single image of the source. Likewise, a series, of parallel planes will appear as a sequence of multiple images located within the sampled volume.

The invention can be carried out by many systems that incorporate a substantial amount of presently used seismic equipment. The first requirement is that an areally extensive array of seismic energy receiving locations be used to supply a relatively large amount of seismic data. A large amount of data is required in order that the reconstructed image will have sufficient detail to be useful in interpreting the results of the survey. The elastic waves are preferably generated from a point source in order that they will in effect be coherent waves of a single frequency or at least a predominant frequency. The generated waves are converted to a related electrical signal that is then supplied to a phase-shifting and voltage-controlling circuit. The related signal is shifted in phase and is voltage-controlled and then supplied to a series of mixing circuits where it is mixed with an electrical signal corresponding to each received seismic signal, with the mixed signals being rectified and recorded. Thus, it is seen that the reflected waves are received, converted to related electrical signals that are then mixed with a reference electrical signal that is equivalent to a reference elastic wave, rectified and recorded. This areal distribution of resulting acoustic intensities is a seismic hologram having characteristics analogous to those of an optical hologram.

The signals of the above type can be converted to an optical hologram by various means. The recorded signals can be re-recorded, for example on magnetic tape, in order that the recorded signals may be placed in the desired sequence. The magnetic tape can then be played back so that the signals are supplied to a cathode ray oscilloscope circuit. The cathode ray oscilloscope screen can be divided into areas corresponding to the location and disposition of the original receivers. Thus, the beam-brightening, or Z-axis of the scope, can be modulated by the signal from a particular seismometer that is assigned to a particular area of the scope. This will result in a display on the front of the oscilloscope corresponding to an optical hologram analogous to a seismic hologram as it would appear at the array of receiving locations. This display will contain information of phase and amplitude due to the mixing of the originally received diffracted waves with the transmitted coherent waves and corresponds substantially to a holographic record. The information on the face of the oscilloscope can then be recorded by suitable photographic means in order to provide a photographic record, such as a transparency or replica, of the seismic hologram. The photographic transparency can then be converted to a visual image using the same techniques that are used with optical holograms. For example, the transparency may be illuminated with monochromatic light as for example from a laser beam and the resulting optical images will be a visual optical display of the original acoustic images of reflective surfaces and other discontinuities within the acoustically sampled portion of the earth.

DESCRIPTION OF DRAWINGS

The above advantages of this invention and its operation will be more easily understood from the following detailed description when taken in conjunction with the attached drawings in which:

FIGURE 1 is a prospective view of the seismic exploration system utilized in this invention;

FIGURE 2 is a block diagram of the field recording circuits used in this invention; and FIGURE 3 shows one means for converting the field-recorded data to a photographic record.

FIGURE 4 illustrates one means for diffracting spatially coherent monocromatic light from a hologram display.

DESCRIPTION OF PREFERRED EMBODIMENTS

The acoustical hologram of this invention is analogous to an optical hologram and many of the same techniques are used in obtaining it. Optical holograms are described and illustrated in considerable detail in an article that appeared in Scientific American, June 1965, pages 24–35. As used in the article, an optical hologram refers to a visibly recorded pattern preserving the phase and amplitude of light waves that are defracted from an object that is illuminated with spatially coherent monochromatic light. One method used for obtaining an optical hologram consists of mixing the diffracted light with a reference beam of the coherent light and recording the resulting mixture on a photographic plate. The recording will thus preserve the phase as well as the amplitude of the diffracted light.

The term "acoustical hologram" as used in this invention refers to a recorded pattern of the phase and amplitude of acoustic waves that are diffracted from an object that is illuminated with coherent acoustic waves. In particular, the invention relates to the diffracting of seismic waves by interfaces and other acoustically reflective discontinuities in the earth. In theory, an acoustic hologram could be produced by mixing the diffracted acoustic waves which appear at a sufficiently large number of points with a reference beam of the coherent acoustic waves and recording the resultant spatial distribution of intensity.

The invention is primarily useful in seismic explorations in which elastic or seismic waves are generated and the reflected and diffracted waves recorded. As explained above, to provide a useful recording the reflected seismic waves must be recorded at a large number of points covering an extensive area.

The hologram produced by a point source due to a single reflecting surface parallel to the earth's surface will consist of interference maxima and minima radially about the source. For a reflecting plane 50 wavelengths below the surface, the first minimum will be approximately 10 wavelengths and the first maximum approximately 14 wavelengths from the source. The maxima and minima will get progressively closer together as the distance from the source increases. The maxima will occur as follows: second at 20.1 wavelengths, third at 24.7 wavelengths, fourth at 28.6 wavelengths, fifth at 32 wavelengths, etc. For deeper reflecting layers the maxima and minima will be of lower spatial frequency. The larger the area recorded and the denser the observations in the hologram, the sharper will be the reconstructed images of the source. It will be usually sufficient to record several maxima and minima of the deepest image of interest. For practical purposes an area of 30 to 50 wavelengths on a side should be sufficient.

The shallowest image to be studied will determine the distance between observation points. For example a uniform spread of 30 geophones spaced 100 feet in each direction for a total of 900 geophones could be used to survey an area of approximately 0.36 square mile for a wavelength of 50 feet. In seismic exploration operations it is normally not feasible to provide a seismic reference wave that can be mixed with the diffracted and reflected waves that illuminate the recording area. Thus, in the present invention the reference wave is preferably simulated by converting the original seismic or elastic waves to an analog electrical reference signal that may then be mixed or added to the electrical analog/electrical signals corresponding to diffracted and reflected waves received at the various geophones. The resulting mixed signals are the same as those that would be produced if the recording area were illuminated simultaneously by both the diffracted and reflected waves and a reference beam of the coherent seismic or elastic waves.

Referring to FIGURE 1 there is shown in a schematic manner the general arrangement used for obtaining the recorded signals of this invention. More particularly, there is shown a horizontal plane which indicates the receiver array. As explained above, this receiver array must be rather extensive to provide a sufficient amount of data to obtain a meaningful acoustic hologram. The number of individual seismometers used may vary over wide limits but their density per unit area of the survey must be rather high. For example, 30 by 30 seismometer spread may be used to survey an area of 0.4 square mile. Each of the individual seismometers indicated by the points 13–16 is located in a particular $x$, $y$ position. This position must be known and recorded in order that the data, when played back, may be placed in its proper orientation. The seismic or elastic waves are generated at a point 10 which is indicated as being the "source point." The continuous seismic waves may be generated by any of the well known methods, for example, a mechanical oscillator, an electromechanical oscillator, a fluid oscillator or a magnetostrictive oscillator. The important requirement for the source of seismic waves is that it generate substantially coherent waves. The seismic waves then travel downwardly through the earth and are partially reflected from each discontinuity and interface in the sampled volume of the earth. One such discontinuity is shown by the reflector 11 as a plane reflector. The reflector 11 reflects the seismic waves upwardly to the geophones where they are received and converted to related electrical signals. In FIGURE 1 the image 10' of the source 10 in reflector 11 is shown. Although only single reflected rays are shown from source to the seismometers on the drawing, in actuality, numerous rays having various phase relationships are reflected upwardly from the reflector 11.

A recording system that can be used to record seismic data is shown in block diagram form in FIGURE 2. Individual geophones 20 are coupled to tuned amplifiers 21 that amplify the predominant or coherent frequency of the received seismic waves. The generated seismic waves may be converted to the related electric signal by means of a geophone 22 which is indicated as a "source point" seismometer. The seismometer 22 is coupled to a phase-shifting and voltage-control circuit 23. The circuit 23 is adapted to shift the phase of the generated seismic waves a predetermined amount and control the voltage of the signal at a fixed amplitude. If the phase is kept constant in the signal mixed with the signal corresponding to the seismic waves received at each receiving point, the equivalent acoustic reference signal would be a plane wave parallel to the recording plane. The signal from the phase-shifting circuit 23 and the tuned amplifier 21 are combined in a mixing circuit 24, where they are mixed to provide a composite signal. The mixing circuit and rectifier 24 can be a conventional amplifier having an input circuit adapted to accept both the signals and a square-law detector. The signal from the detector circuit is then recorded on a recorder 25 that may be conventional digital recording circuit, tape recording circuit, or a recording galvanometer. It is preferable that the signal be recorded in a digital form on magnetic tape or as an FM signal on magnetic tape to preserve its electrical form since subsequent playback circuits require electrical input signals.

The above-described circuit will thus provide a recorded signal of the acoustic waves having characteristics similar to the signal that is recorded at one point on an optional hologram. More particularly, the recorded signal will include both the amplitude and the phase relationship of the individual waves arriving at each of the geophones. This recording is achieved by mixing the original seismic waves with the reflected waves after adjusting the phase relationship between the two signals. While only a single geophone recording system is shown in FIGURE 2, similar circuits are used for each geophone of the spread shown in FIGURE 1. The recording of the signals should be in a sequence which preserves the geometrical disposition of the individual geophones of the spread.

It is not necessary to receive or record the data from the entire array simultaneously. One seismometer can be used to scan all receiving locations in the array and the pattern can be recorded sequentially.

Referring now to FIGURE 3 there is shown a playback system by which the field recorded data may be converted to a visible record. More particularly, the recorded signals 30 are played back and re-recorded on magnetic tape 31. In re-recording, the seismic signals are disposed in a particular sequence in order that the subsequent processing may be simplified. The re-recorded signals are then supplied to the cathode ray oscilloscope circuits 32. The cathode ray oscilloscope circuits 32 include the horizontal and vertical sweep circuits as well as the beam-brightening circuits for the cathode ray oscilloscope 33. The face of the cathode ray oscilloscope 33 is divided into areas with each geophone of the original field spread being assigned a particular area on the face of the oscilloscope. More particularly, the face of the oscilloscope is divided into the same geometrical array of areas as the original geophone array. The individual field-recorded signals are then displayed in their assigned area on the face of the oscilloscope and thus create an optical analogue of the seismic hologram recorded at the various geophones disposed in the spread of FIGURE 1. The face of the oscilloscope can be photographed by means of a lens 34 and a photographic plate 35 to provide a film transparency of the hologram.

The seismic signals recorded on the photographic transparency 35 may be converted to a visible form by directing coherent, monochromatic light on the film transparency. For example, as illustrated in FIGURE 4 a conventional laser light beam 40 may be directed through the photographic transparency 41 by means of lenses 42 and 43. The laser light will recreate a light pattern that may be observed as visible image 44 from an observation point 45. If the surveyed space contains a single point scatterer, it will appear as a bright point in the optical field a scaled distance from the transparency. If the space contained a single perfectly reflecting interface and there were no reflections from the surface, there would appear a single image of the source behind the reflecting plane. A series of parallel reflecting planes would show in space as a sequence of multiple images. Similarly, curved surfaces appear as optically curved images and roughness on a surface with dimensions significant with respect to the wavelength of the original acoustic waves will also appear as bright areas.

Usually the signals from deeper reflecting layers are very much weaker than those from shallow layers. In order to examine the images from the deeper layers the recording equipment and the reproducing equipment would have to have a dynamic range of approximately 80 decibels.

As is pointed out above, the spatial frequency of the hologram decreases with the depth of the image. Consequently the field data can be spatially filtered with a low-pass filter on a digital computer before converting the seismic hologram into an optical hologram. The filtering can also be carried out as shown in FIGURE 3 by a suitable analogue low-pass electrical filter 36 as the field data is being played back into the cathode ray tube, since the intensity variations as a function of distance are converted into an electrical signal varying with time.

By recording the portion of the hologram in an area offset from the source, the required dynamic range is reduced, since the holograms from shallow images decrease in amplitude more rapidly with distance along the surface than the holograms from deep images.

The effect of intense shallow images can be eliminated by using a relatively short wavetrain and gating the recording of the seismometer to record the signal after a suitable time interval. For example, if the average velocity of seismic waves to a depth of 5,000 feet is 10,000 feet per second, the recording would start one second after the pulse started and last for the length of the pulse. Depending on the length of the pulse, the resulting hologram would be of a section of the earth in the neighborhood of 5,000 feet. The pulse must be chosen sufficiently long so that it is nearly coherent and short enough to eliminate the shallow layers. A pulse greater than approximately 20 cycles and less than 50 cycles would be a useful length. The reference signal from the driving source would be continued during the recording.

Another method for emphasizing deeper discontinuities and eliminating shallow discontinuities is to allow a steady state to be established, i.e. operate the source of coherent waves for a period of time long compared to the travel time from source to the seismometer by means of the deepest layer to be observed. The source of the elastic waves is cut off, but the reference voltage is continued and the resulting mixed and rectified signals are recorded as a function of the time. By taking the value of the signal at the same time for each seismometer station, a succession of holograms can be made. The later the time, the more the effects of the shallow layers will be removed.

Since the field data will be recorded in a geometric pattern and not continuously as a function of position, the resulting optical hologram will retain the geometric recording pattern modified by any spatial frequency filtering. This pattern will produce a strong diffraction pattern that will disturb the observation of the seismic images. The effects of such artifacts can be eliminated by optical filtering using suitable masks in the Fourier plane. Such filtering can be carried out in the following manner. The transparent hologram is illuminated with plane parallel coherent light (of the same wavelength to be used to observe the reconstructed hologram); a convergent lens is placed in front of the hologram; a mask is placed at the focal plane of the lens which blanks out the diffraction pattern of the field geometry, another lens focuses the remaining light onto a photographic plate. The result is a new hologram with the artifacts removed.

While a single point source of coherent elastic waves has been described above, two or more point sources, line sources, or area sources may be used in this invention. By suitably spacing and phasing multiple sources various elements of the subsurface can be selectively emphasized.

Further, it is sometimes desirable to make holograms simultaneously at several frequencies. Band-pass filters and multiple recording channels for each seismometer location can be used to provide an independent hologram for each of the frequencies employed. For example, sources of 50, 100, 200 and 500 cycles per second can be employed at the same time. Different frequencies will show different patterns of images and resultant intensities. For low frequencies the layers in the earth appear smooth and consequently observations to great depths can be made. At higher frequencies when the irregularities, say at the interface between a sandstone layer and a salt dome, become a significant fraction of a wavelength, the scattering will be irregular and an image of the interface will be observed in the analogous optically reconstructed hologram.

The magnification of the image space produced in the optical reconstruction of the acoustic hologram is determined by the ratio of the linear dimensions of the analogous optical hologram to the field scale seismic hologram and the ratio of the acoustic wavelength to the optical wavelength used in the reconstruction. Thus, if acoustic holograms are made with different acoustic wavelengths, but are reconstructed with light of the same wavelength, the magnification will be different. In order to obtain the same magnification, the linear scale of one of the holograms must be changed in proportion to the acoustic wavelength. Now, if two acoustic holograms made with different acoustic wavelengths, but with the scale of one adjusted so that the magnification is the same, are superposed and illuminated with a single coherent source of light, the reconstructed image space will contain the two sets of superposed acoustic images—one from each hologram. Even though the images are to the same scale, the detailed distribution of intensity in the images made with different acoustic frequencies will still retain the character of the diffraction pattern originally obtained. Now if one of the holograms is reproduced again photographically, a negative of the original is obtained. This hologram, when illuminated by coherent light, will again reconstruct an image space, but with a phase change of $\pi$ radians. If the hologram made originally with one acoustic wavelength and the negative hologram made with a second acoustic wavelength are superposed, the resulting image space reconstructed will be the difference between the two image spaces. Thus, images which have different relative intensities for different acoustic wavelengths will be emphasized, while those having the same relative intensity will be deemphasized.

Holograms for several different acoustic frequencies can be made by superposing holograms scaled for selected optical wavelengths and illuminating the composite with light of the selected wavelengths. If three analogous optical holograms corresponding to three acoustic frequencies are properly scaled, superposed and illuminated simultaneously with three different colors of coherent light, i.e. red, yellow, and blue, a colored optical reconstruction of the analogous acoustic images is obtained. The colors of the various images will convey information related to the frequency and spacing of the acoustic images. For example, the image formed by a thin layer with a velocity lower than the surrounding medium will be very weak for an acoustic wave with a wavelength long compared to the thickness of the layer. The images formed by shorter wavelengths will be stronger. Thus, viewing the resultant composite hologram in three-colored coherent light, an optical image of the source would appear green or greenish blue. A thick layer would produce different colored images depending on the thickness of the layer.

In the above description, the discussion has been confined to a single elastic wave type, a compressional wave, for simplicity. In elastic media, such as the earth, with many changes in elastic properties, transverse waves and surface waves will all be propagated and conversion of one type to another type will take place at the interface between different elastic properties. It will be understood by those skilled in the art that the waves will produce additional images to be considered interpreting the distribution of elastic properties from the optical reconstruction of the complex acoustic hologram.

I claim as my invention:

1. A process for forming a three-dimensional display of a subterranean structure that reflects and refracts acoustic waves, which process comprises:
   (a) generating coherent acoustic waves of two different frequencies such that their energy is partially reflected and partially refracted by subterranean discontinuities;
   (b) receiving portions of the acoustic energy in each of said frequencies that returns to near surface locations disposed in an areal array;
   (c) producing an electrical, received signal related to energy received at each of said locations:
   (d) producing electrical, coherent wave signals for each of said frequencies related to said coherent acoustic waves adjusted as required to provide a phase that is correlated with the phase and distance between the wave generating and receiving locations;
   (e) mixing the electrical, received wave signal from each wave receiving location with the corresponding electrical, coherent wave signal;
   (f) producing a visible display from said intensity function of mixed signal amplitudes in respect to the coherent acoustic waves of each frequency, one of said displays being made into a negative of the original, the scale of said displays being adjusted so that when said displays are superimposed and illuminated with monocromatic coherent light, the images produced are of the same magnification, but with $\pi$ radians phase difference; and,
   (g) diffracting spatially coherent, monochromatic light from said display, to produce three-dimensional optical images of a subterranean structure.

References Cited

UNITED STATES PATENTS

| | | | |
|---|---|---|---|
| 3,066,754 | 12/1962 | Johnson | 340—15.5 |
| 3,156,110 | 11/1964 | Clynes | 340—3 |
| 3,240,108 | 3/1966 | Lehan et al. | 88—14 |
| 3,284,799 | 11/1966 | Ross | 343—6 |
| 3,400,363 | 9/1968 | Silverman | 340—3 |

OTHER REFERENCES

Leith et al.: "Wavefront Reconstruction with Diffused Illumination and Three-Dimensional Objects"; Journal of the Optical Society of America, vol. 54, No. 11, November 1964, p. 1301.

Greguss: "Techniques and Information Content of Sonoholograms"; The Journal of Photographic Science, vol. 14 (1966), pp. 330–331.

RODNEY D. BENNETT, JR., Primary Examiner

C. E. WANDS, Assistant Examiner